United States Patent Office 3,732,199
Patented May 8, 1973

3,732,199
PEPTIDE SYNTHESIS
John S. Paul Schwarz, State College, Pa., assignor to
E. R. Squibb & Sons, Inc., New York, N.Y.
No Drawing. Continuation-in-part of application Ser. No.
741,215, June 28, 1968. This application Mar. 15, 1971,
Ser. No. 124,554
Int. Cl. C07c *103/52*
U.S. Cl. 260—112.5                         8 Claims

ABSTRACT OF THE DISCLOSURE

Improvement in the synthesis of peptides involving the formation of novel active intermediates. These active intermediates are formed by reaction at lowered temperatures of an imidyl halide with the tertiary ammonium salt of the acid moiety of an amino acid or peptide. The intermediate thus formed is then reacted with the amino moiety of the amino acid or peptide to be coupled, thus forming the desired peptide or polypeptide.

This application is a continuation-in-part of our application Ser. No. 741,215, filed June 28, 1968.

This invention relates to a novel method of forming peptide bonds which provides certain advantages hereinafter set forth over the commonly employed methods presently utilized in the art.

Heretofore many methods of forming peptide bonds have been described in the literature. Two of the most commonly employed of such methods are the mixed anhydride method and coupling by means of a coupling reagent such as dicyclohexylcarbodiimide. The latter method has enjoyed the greatest popularity of any yet devised, probably as a result of the high reactivity of the carbodiimides, which results in reactions which proceed smoothly and are completed within a short period of time.

However, each of these methods is beset with various disadvantages. The mixed anhydride method is not always amenable to the use of other than symmetrical anhydrides since using unsymmetrical anhydrides can lead to acylation by the "wrong" acyl group. The carbodiimide coupling method at least partially diminishes this problem, although, since in the preparative procedure, the carbodiimide is added to a mixture of the amino acids to be coupled, some difficulty remains due to attack of the carbodiimide by the amino function. In using this method, because the reagent is added directly to the mixture of compounds to be coupled, any carboxyl groups in the molecule bearing the amine function must be protected to prevent their reactions with the diimide. An even more serious problem connected with the carbodiimide reaction is the rearrangement of the highly active O-acylisourea intermediate to an acylurea, which rearrangement is very difficult to control due to the high reactivity of the carbodiimides.

It has now been discovered that the above disadvantages can be either greatly diminished or eliminated. In accordance with the present invention, a tertiary ammonium salt of one of the N-protected amino acids to be coupled, or the N-protected amino acid in the presence of a tertiary amine, is first reacted at lowered temperatures with an imidyl halide as hereinafter set forth to form an active intermediate. This active intermediate is in turn reacted with another amino acid, or peptide if it is desired to add an amino acid to an existing peptide chain, in order to form the desired peptide bond. The reaction is shown schematically below, wherein R represents phenyl or lower alkyl-substituted phenyl, such as tolyl, xylyl, mesityl, cumyl, and the like;

$R^1$ represents alkyl of up to 10 carbon atoms, phenyl, or phenyl-lower alkyl, such as phenethyl, and the like;

$R^2$ represents the residue of any N-protected amino acid including, for example, lower alkylamino (either branched or straight chain), e.g., glycine, alanine, valine, leucine, isoleucine, β-alanine, β-leucine, α-aminobutyric acid, α-aminoisobutyric acid, β-aminobutyric acid, and the like; hydroxy lower alkylamine, e.g., serine, threonine, β-hydroxyleucine, and the like; phenylamine, e.g., para-aminobenzoic acid, paraaminophenylacetic acid and the like; substituted phenylamine wherein the substituent is selected from the group consisting of hydroxy, methoxy, and benzyloxy, e.g., paraaminosalicylic acid, and the like; phenyl-lower alkylamine, e.g., phenylalanine, and the like; substituted phenyl-lower alkylamine wherein the substituent is selected from the group consisting of hydroxy, methoxy, benzyloxy, and the like, e.g., tyrosine, and the like; mercapto-lower alkylamine, e.g., cysteine, and the like; lower alkyl-mercapto-lower alkylamine, e.g., methionine, and the like; carboxy-lower alkylamine, e.g., aspartic acid, glutamic acid, and the like; amino-lower alkylamine, e.g., lysine, ornithine, and the like; amido-lower alkylamine, e.g., glutamine, asparagine, and the like; ureido-lower alkylamine, e.g., citrulline, guanido-lower alkylamine, e.g., arginine, and the like; imidazolyl-lower alkylamine, e.g., histidine, and the like; indolyl-lower alkylamine, e.g., tryptophane, and the like; pyrrolidine, e.g., proline; or piperidine, e.g., 2-piperidine carboxylic acid;

$R^3$ represents a residue of an amino acid as set forth above, a residue of a peptide acid formed by the continuation, through an amide bond, of two or more amino acids, such as those set forth above, or a β-lactam antibiotic nucleus, e.g., 6-aminopenicillanic acid, 7-aminocephalosporanic acid, or 7-aminodesacetoxycephalosporanic acid; and Y represents t-alkylammonium wherein the alkyl radical has from 1 to 8 carbon atoms, such as trimethylammonium and triethylammonium

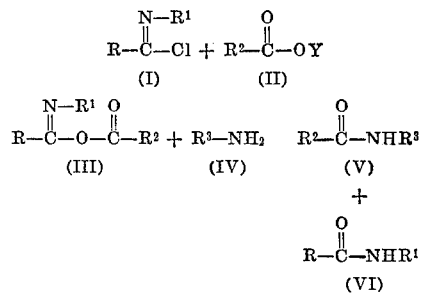

In the first step of the above process, the imidyl chloride (I) is reacted at lowered temperatures with a salt of the N-protected amino acid (II) to be coupled or with the N-protected amino acid in the presence of a tertiary amine to form the reactive intermediate (III).

The temperatures employed are not above about 10° C., preferably not above about 5° C., and most preferably not above about 0° C. A typical temperature range is from about −25° C. to about 10° C., preferably from about −25° C. to about 5° C., and most preferably from about −235° C. to about 0° C. At these temperatures the reactive intermediate (III) forms rapidly and is stable for several hours whereas at about room temperature or above it is unstable and forms rearrangement products.

The N-terminal amino group may be protected by any suitable amino protecting group. Such protecting groups are well known to those skilled in the art and their use is described in standard works on peptide synthesis, e.g., Bodanszky et al., "Peptide Synthesis," Interscien, 1966.

This reactive intermediate (III) is in turn reacted with the amino moiety of the amino acid or peptide (IV) to be coupled. In this reaction the acyl group of the active intermediate (III) is transferred to the amine, thus forming the desired peptide bond and the product (V). Any acid groups present in Compound IV should be employed in the form of an amine salt. Any tertiary amine may be employed in the formation of such salts of Compound IV, the only requirement being that the amine be a stronger base than the amine to be acylated. Exemplary of such amines are trialkylamines wherein the alkyl radical has from 1 to 8 carbon atoms, preferably from 1 to 3 carbon atoms, such as, e.g., triethylamine and trimethylamine.

During the course of the above reaction sequence, the amino and guanidino functions of the compound in accordance with Formula II must be protected. This may be accomplished through the use of adding any suitable amino protecting groups, such as, for example, benzyloxycarbonyl, t - butyloxycarbonylphthalyl, o-nitrophenylsulfenyl, tosyl, and the like. Guanidine functions may be protected by any suitable protecting groups such as, for example, nitro, tosyl, p-nitrobenzyloxycarbonyl, and the like. Such protecting groups are well known to those skilled in the art and their use is described in standard works on peptide synthesis, e.g., Bodanszky et al. op. cit. Upon completion of the reaction, protecting groups may be removed by any suitable reaction such as reduction with sodium and liquid ammonia, hydrogenolysis (for instance in the presence of palladium on charcoal catalyst), treatment with a hydrohalic acid (such as hydrobromic or hydrochloric acids) in acetic acid or treatment with trifluoroacetic acid.

To prepare free amines after treatment with a hydrohalic acid in acetic acid, the hydrohalide salt is treated either with an ion exchange resin such as Amberlite IR400 or neutralized with amine such as triethylamine.

Among the advantages of this method are that the acylations may be carried out in any nonreactive organic solvent which dissolves the reagents, such as, for example, $CHCl_3$, $CH_2Cl_2$, DMF, and the like. When carried out at temperatures of from about −25° to about 10° C., rearrangement of the active intermediate (III) is kept to a minimum and essentially the only by-product formed is Compound VI, which is the formal hydrolysis product of Compound I. Further, the isolation of the desired product presents no difficulties since the by-product (VI) is organic-extractable (for instance, with $CHCl_3$, benzene, ether, and the like), whereas the peptide product is bicarbonate soluble.

The novel process of this invention may be adapted to solid-state peptide synthesis by converting a resin containing benzoic acid groups through the following sequence. Any resin containing carboxylic acid groups may be employed as long as it is insoluble in the solvents employed and has a stable physical form permitting ready filtration (e.g., a styrene-divinylbenzene or a polystyrene). The carboxyl groups of the resin may be converted to an imidyl halide by the following reaction sequence:

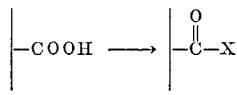

(by reacting the resin with, for example

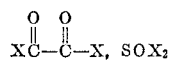

or $PX_5$ wherein X is chlorine or bromine)

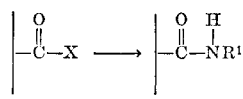

(by reacting the acid halide with $R^1NH_2$ in the presence of trialkylamine, $R^1$ being as defined above)

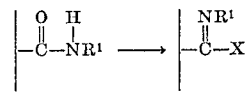

(by reacting the amide with, for instance, $PX_5$, $SOX_2$, and the like wherein X is chlorine or bromine.

The resin in the imidyl halide form can be converted to the active ester (VII) through the following reaction sequence:

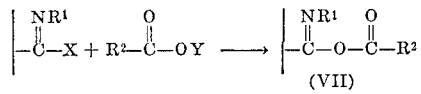

wherein $R^1$, $R^2$ and Y are as defined above.

On treatment of the resin with a solution of the trialkylamine salt of an amino acid (VIII), in an inert solvent, such as, for example, dioxane, benzene, xylene, toluene, methylene chloride or chloroform, one obtains the new peptide (X) which can easily be separated from the by-product resin (IX) as shown below:

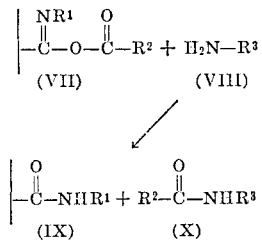

wherein $R^1$, $R^2$ and $R^3$ are as defined above.

The advantage of this resin-type reaction is that the by-product does not contaminate the product, and the amino acid to be coupled (VIII) need not be protected at the carboxylic acid end.

As indicated above, the novel process of this invention may be used to prepare amides other than peptides. For instance, in the preparation of semi-synthetic penicillins, a wide range of methods have been used to couple the side chain acid to 6-amino-penicillanic acid. The type of penicillin to be prepared at times puts stringent limitations on the method employed. One type that requires delicate treatment is the synthesis of amino-substituted penicillins. An example is given where benzyloxycarbonyl (CBO-protected) ampicillin is prepared by means of the imidyl chloride method.

This reagent can also be used in the solid-state peptide synthesis method of Marshall and Merrifield [Biochemistry, 4, 2328 (1965)]. The activated ester of the protected amino acid to be coupled is added directly to the peptide on the resin rather than the two-step process of Marshall and Merrifield where the solution of protected amino acid to be coupled is added to the resin prior to the addition of the activating reagent DCC.

The following examples illustrate the instant invention; all temperatures are in degrees centigrade unless otherwise specified.

EXAMPLE 1

N-phenylbenzimidyl chloride

Benzanilide (100 g., 0.507 mole) is refluxed with thionyl chloride (75 ml.) until the evolution of hydrochloric acid is completed. The excess thionyl chloride is removed under reduced pressure and the residue is distilled under reduced pressure to yield the product, M.P. 39.5–41° C.

EXAMPLE 2

N-benzyloxycarbonylglycylalanine

N-phenylbenzimidyl chloride (0.216 g., 1 mmole) dissolved in 5 ml. of ethanol-free chloroform and N-benzyloxycarbonylglycine (0.209 g., 1 mmole) dissolved in ethanol-free chloroform containing a three-times equimolar amount of triethylamine are cooled to 0° C. and then are mixed. After 30 minutes, alanine (0.267 g., 3 mmoles) dissolved in ethanol-free chloroform at 0° C. containing a three-times equimolar amount of triethylamine is added, and the resulting mixture is kept at 0° for 18 hours. At the end of this time the chloroform solution is extracted three times with 20 ml. of 2 N hydrochloric acid, three times with 20 ml. of water, and finally with 20 ml. of 1 N aqueous sodium bicarbonate. The bicarbonate extract is acidified to pH 2 with 2 N hydrochloric acid, and the resulting mixture is extracted with chloroform. The chloroform is evaporated to yield the product.

EXAMPLE 3

N-benzyloxycarbonylglycylalanine

The procedure of Example 2 is followed except that the reaction is run at room temperature and the time stated, 30 minutes, is reduced to 5 minutes.

EXAMPLE 4

Sodium 6-N-benzyloxycarbonyl-D-phenylglycylamino penicillanate

The procedure of Example 2 is repeated except that N-benzyloxycarbonyl-D-phenylglycine is used in place of N-benzyloxycarbonylglycine and 6-aminopenicillanic acid is used in place of alanine. The various extractions are done at 0° (using ether in the final extraction of Example 2). This final extract is stirred with an equal volume of water at 0° C. while the pH of the aqueous phase is adjusted to 7 using 1 N NaOH. The aqueous solution is freeze-dried to yield the product.

EXAMPLE 5

N-p-tolylbenzimidyl chloride

Following the procedure of Example 1 but substituting an equivalent amount of N-benzoyl-p-toluidene for the benzanilide. The above product is obtained in good yield.

N-phenyltoluimidyl chloride for the N-phenylbenzimidyl chloride, the desired product is obtained.

EXAMPLE 9

N-methylbenzimidyl chloride

Following the procedure of Example 1 but substituting N-methylbenzamide for the benzanilide, there is obtained the above product.

EXAMPLE 10

N-benzyloxycarbonyl-D-phenylglycylalanine

Following the procedure of Example 2 but substituting N-methylbenzimidyl chloride for the N-phenylbenzimidyl chloride, N-benzyloxycarbonyl-D-phenylglycine for the N-benzyloxycarbonylglycine, and anhydrous methylene chloride for the ethanol-free chloroform and a temperature of −25° C. in place of 0° C., the above product is recovered.

EXAMPLE 11

N-benzylbenzimidyl chloride

Following the procedure of Example 1 but substituting N-benzylbenzamide for the benzanilide, the above product is obtained.

EXAMPLE 12

N-benzyloxycarbonylalanylglycine

Following the procedure of Example 2 but substituting N-benzylbenzimidyl chloride for the N-phenylbenzimidyl chloride, N-benzyloxycarbonylalanine for the N-benzyloxycarbonylglycine, glycine for the alanine, and dimethylformamide for the ethanol-free chloroform, the above product is recoverd.

EXAMPLES 13 TO 24

With reference to the following table, following the procedure of Example 2, but substituting an equivalent amount of a compound of Column A for the N-benzyloxycarbonylglycine and an equivalent amount of the compound of Column B for the alanine, the compound of Column C is obtained.

| Example No. | A | B | C |
|---|---|---|---|
| 13 | N-CBO[1]-p-aminobenzoic acid | Serine | N(N-CBO-p-aminobenzoyl) serine. |
| 14 | N-CBO-serine | p-Aminosalicylic acid | N(N-CBO-seryl)p-amino-salicylic acid. |
| 15 | N-CBO-aminosalicylic acid | Phenylalanine | N-CBO-p-aminosalicyloylphenylalanine. |
| 16 | N-CBO-phenylalanine | S-benxylcysteine | N-CBO-phenylalanyl-S-benzylcysteine. |
| 17 | N-CBO-S-benzylcysteine | Methionine | N-CBO-S-benzylcysteineylmethionine. |
| 18 | N-BOC[2]-methionine | Tyrosine | N-BOC-methionyltyrosine. |
| 19 | N-CBO-tyrosine | Aspartic acid | N-CBO-tyrosylaspartic acid. |
| 20 | N-CBO-β-benzylaspartate | Nε-CBO-lysine | N-CBO-β-benzylaspartyl-Nε-CBO-lysine. |
| 21 | Nz-CBO-lysine | Asparagine | Nε-CBO-lysylasparagine. |
| 22 | N-CBO-asparagine | Nω-nitroarginine | N-CBO-asparaginyl-Nω-nitroarginine. |
| 23 | Nα-CBO-Nω-nitroarginine | Histidine | Nα-CBO-Nω-nitroarginylhistidine. |
| 24 | Nα Nim-bis-CBO-histidine | Tryptophan | Nα-Nim-bis-CBO-histidyltryptophan. |

[1] CBO=Benxyloxycarbonyl.   [2] BOC-t-Butyloxycarbonyl.

EXAMPLE 6

Sodium-7-N-benzyloxycarbonyl-L-glycylamino cephalosporanic acid

Following the procedure of Example 4 but substituting equivalent amounts of N-benzyloxycarbonyl-L-glycine for the N-benzyloxycarbonyl-D-phenylglycine, 7-aminocephalosporanic acid for the 6-aminopenicillanic acid, and N-p-tolylbenzimidyl chloride for the N-phenylbenzimidyl chloride, the desired product is obtained.

EXAMPLE 7

N-phenyltoluimidyl chloride

Following the procedure of Example 1 but substituting an equivalent amount of N-phenyltoluamide for the benzanilide, the desired product is obtained.

EXAMPLE 8

Sodium 6-N-benzyloxycarbonyl-D-phenylglycylamino penicillanate

Following the procedure of Example 4 but substituting

EXAMPLE 25

Polymeric imidyl chloride 3 g. of a styrene-divinylbenzene "popcorn" polymer possessing 0.33 milliequivalent of carboxyl per gram of dry powder as described by R. L. Letsinger, M. J. Kornet, V. Mahadevan, and D. M. Jerina in JACS, 86, 5163–5 (1964) (3 g. 1 meq. of —COOH) is stirred in 10 ml. of ethanol-free chloroform with triethylamine (0.202 g., 2 mmoles) and 1 ml. of oxalyl chloride. After 30 minutes the resin as placed on a column and washed with 100 ml. of ethanol-free chloroform. The resin (acid chloride form) is removed from the column and stirred for 2 hours with 10 ml. of ethanol-free chloroform containing 1 ml. of triethylamine and 1 ml. of aniline. The resin is again transferred to a column and washed with 100 ml. of ethanol-free chloroform.

The resin (carboxanilide form) is removed from the column and refluxed with 10 ml. of thionyl chloride for 2 hours. The excess thionyl chloride is removed under vacuum, and the resin is placed on a column and washed with 100 ml. of ethanol-free chloroform. This product is used directly in Example 26.

EXAMPLE 26

N-benzylcarbonylalanylphenylalaninetriethylamine salt

The polymeric imidyl chloride from Example 25

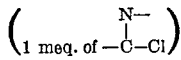

is stirred with a solution of N-benzyloxycarbonylalanine (0.446 g., 2 mmole) and triethylamine (0.808 g., 8 mmole) in 10 ml. of chloroform for 30 minutes at 0° C. At the end of this time the resin is washed at 0° on a column (as before) with 100 ml. of ethanol-free chloroform. The resin is then stirred for 18 hours at 0° with a solution of phenylalanine (0.151 g., 1 mmole) and triethylamine (0.404 g., 4 mmole) in 20 ml. of ethanol-free chloroform. At the end of this time the chloroform is decanted from the resin and evaporated to yield the product.

EXAMPLE 27

Triethylammonium 6-N-benzyloxycarbonylglycylaminopenicillanate

The procedure of Example 26 is followed but substituting N-benzyloxycarbonylglycine for N-benzyloxycarbonylalanine and 6-aminopenicillanic acid for phenylalanine.

EXAMPLE 28

L-phenylalanyl-L-phenylalanine

The compound is made utilizing the procedure of Marshall and Merrifield [G. R. Marshall and R. B. Merrifield, Biochemistry, 4, 2398 (1965)] except that the active ester (from an imidyl chloride) of the BOC protected amino acid is used as the acylating agent rather than the mixture of DCC and the GOC protected amino acid as in the stated reference.

Begin with 5 g. of BOC-L-phenylalanyl resin and use the reaction cycle described under the preparation of BOC - β - benzyl - L - aspartylnitro-L-arginyl-L-valyl-O-benzyl-L-tyrosyl - L - isoleucyl-im-benzyl - L - histidyl-L-prolyl-L-phenylalanyl resin except that steps 9 and 10 are deleted and for them the following step is substituted:

Solutions of BOC-phenylalanine (1.06 g., 4 mmoles) dissolved in 20 ml. of methylene chloride containing triethylamine (0.808 g., 8 mmoles) and N-phenylbenzimidyl chloride (0.864 g., 4 mmoles) in 5 ml. of methylene chloride are mixed and allowed to stand at room temperature for 5 minutes. The resin is introduced, and the resulting mixture is stirred for 2 hours.

The final product is obtained from the resin using the procedure described by Marshall et al., supra, for L-aspartylnitro-L-arginyl-L-valyl - L - tyrosyl-L-isoleucyl-im-benzyl-L-histidyl-L-prolyl-L-phenylalanine.

This invention may be variously otherwise embodied within the scope of the appended claims.

What is claimed is:

1. A process for the preparation of an amide comprising reacting an imidyl halide of the formula

wherein R is phenyl, lower alkyl-substituted phenyl, or wherein the phenyl or lower alkyl-substituted phenyl radicals are part of an insoluble styrene-divinylbenzene or polystyrene resin and $R^1$ is lower alkyl, phenyl, phenyl-lower alkyl and X is halogen, with an amino acid of the formula

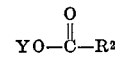

wherein $R^2$ is the residue of an N-protected amino acid and Y is t-lower alkylammonium to form an intermediate of the formula

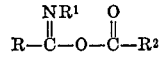

and then reacting the intermediate with an amino acid or a peptide of the formula

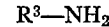

wherein the acid groups are in the form of an amine salt, and wherein $R^3$ is the residue of an amino acid, a peptide or a β-lactam antibiotic nucleus, both reactions taking place at a temperature of from about −25° C. to about 10° C.

2. A process in accordance with claim 1 wherein the imidyl chloride is a polymeric imidyl chloride derived from a styrene-divinylbenzene copolymer possessing 0.33 milliequivalent of carboxyl per gram.

3. A process in accordance with claim 1 wherein the imidyl chloride is N-phenylbenzimidyl chloride, N-p-tolylbenzimidyl chloride, N-phenyltoluimidyl chloride, N-methylbenzimidyl chloride, or N-benzylbenzimidyl chloride.

4. A process according to claim 1 wherein both reactions are carried out at temperatures from about −25° C. to about 5° C.

5. A process in accordance with claim 4 in which the reactions are carried out at a temperature of about 0° C.

6. A process according to claim 1 wherein said second amino acid or peptide is attached, through an ester bond, to an insoluble polymer prior to reaction with said intermediate.

7. A process according to claim 1 wherein R is part of an insoluble styrene-divinylbenzene or polystyrene resin.

8. A process according to claim 1 wherein $R^1$ is phenyl or lower alkyl-substituted phenyl.

References Cited

Cramer, et al.: Chem. Ber. 93 (1960), pp. 1231–1236.
Fridkin et al.: J. Am. Chem. Soc. 88 (1966), pp. 3164–3165.
Letsinger et al.: J. Am. Chem. Soc. 86 (1964), pp. 5163–5165.
Mitin et al.: Zh. Obsch Khim, 35 (1965), pp. 861–864.

ELBERT L. ROBERTS, Primary Examiner